July 19, 1966 M. E. CLYNES 3,262,104
MULTI-TRACK DATA RECORDING SYSTEM
Filed July 11, 1961
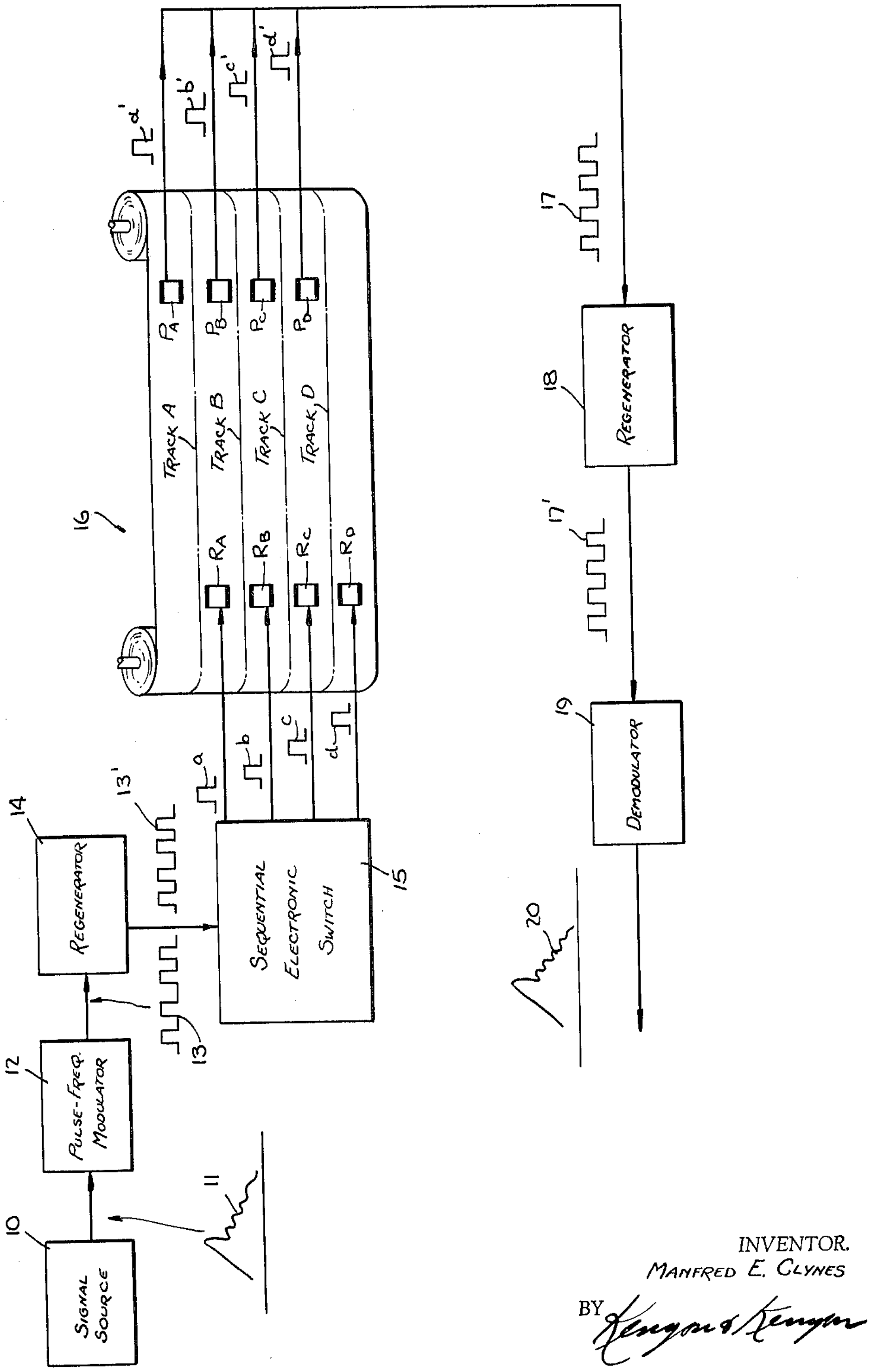
INVENTOR.
MANFRED E. CLYNES
BY Kenyon & Kenyon
ATTORNEY // United States Patent Office 3,262,104

Patented July 19, 1966

3,262,104

MULTI-TRACK DATA RECORDING SYSTEM

Manfred E. Clynes, Orangeburg, N.Y., assignor, by mesne assignments, to Technical Measurement Corporation, North Haven, Conn., a corporation of Delaware Filed July 11, 1961, Ser. No. 123,272

5 Claims. (Cl. 340—174.1)

This invention relates to magnetic tape recording systems for recording data pulses in the high-frequency range.

In my copending application entitled "Information Transfer Systems," Serial No. 829,694, filed July 27, 1959, now Patent No. 3,168,721, there is disclosed a low cost data storage system which may be operated effectively in conjunction with an ordinary tape recorder of inexpensive design. Heretofore, to insure faithful storage of analog data, it was the practice to use magnetic recording equipment of the finest quality including tape transport mechanisms of high accuracy and other expensive components. The system disclosed in said copending application affords results at least as good as that attained with equipment of far greater cost by employing a system of pulse-frequency-modulation which, despite recording distortion, produces an output signal that is a faithful replica of the input signal.

In a system of this type, the input signal, which is of varying amplitude, is applied to a pulse-frequency-modulator to generate pulses having a repetition rate proportional to the amplitude of the signal throughout a wide range. The pulse modulator preferably takes the form of an asymmetrical multivibrator producing pulses whose carrier frequency is caused to vary with the modulating signal amplitude.

In some situations it is desirable to operate with a relatively high carrier pulse frequency in the order of 300,000 pulses per second and higher. Such pulse frequencies are difficult to record on magnetic recorders of ordinary quality, particularly with low tape speeds.

Accordingly, it is the principal object of this invention to provide a tape recording system for recording high-frequency pulses with a minimum degree of distortion. A significant feature of the invention is that it effectively increases the capacity of a system to record high-frequencies.

More specifically it is an object of the invention to provide a multiple track magnetic recording system for recording a high-frequency pulse train in a manner whereby the pulses derived from a single source are compressed sequentially and cyclically on the several tracks, and in play-back are recombined to recreate the original signal.

Also an object of the invention is to provide a multiple track recording system which operates efficiently to record pulse data and which is of inexpensive and reliable design.

Briefly stated, these objects are attained in a multiple-track recording system in which the signal from a single source is applied to a pulse-frequency modulator to produce a train of data pulses whose repetition rate is proportional to the varying amplitude of the signal, the pulses being applied through an electronic commutator sequentially and cyclically to the tracks of a multiple track recorder, whereby the number of pulses impressed on each track is equal to the total number of pulses in the train divided by the number of tracks. In play-back, the pulses derived from the several tracks are recombined to recreate the original pulse train.

For a better understanding of the invention, as well as other objects and further features thereof, reference is made to the following detailed description to be read in connection with the accompanying drawing showing a block diagram of a system in accordance with the invention.

Referring now to the drawing, block 10 designates a signal source producing an amplitude-modulated voltage represented by waveform 11. This wave may be that yielded, for example, in the output of an electrocardiograph device or by various other forms of biological and non-biological instruments providing output information in the form of a varying voltage.

The signal 11 is fed either directly or through suitable amplifiers to a pulse, frequency-modulator 12 adapted to generate pulses having a repetition rate which is proportional to the varying amplitude of the signal. The invention is of particular value in connection with modulators producing a carrier frequency in excess of 200,000 cycles per second, the carrier rate being varied as a function of the signal.

Suitable modulator circuits for this purpose are disclosed in applicant's copending applications Ser. No. 829,694, filed July 27, 1959, and Serial No. 72,171, filed November 25, 1960, now Patent No. 3,100,285, the modulator being comprised of an astable asymmetrical multivibrator generating pulses which vary about the carrier frequency in accordance with the applied signal. Thus the output of the modulator consists of frequency-modulated pulses represented in the drawing by data pulse train 13.

To standardize the amplitude and duration of the data pulses, they are fed into a regenerator or pulse shaper 14 which may take the form of a monostable multivibrator which in response to each input pulse produces a single uniform pulse.

The standardized data pulses 13' are then fed sequentially and cyclically through an electronic commutator 15 to the respective tracks of a multiple track recording system 16 of conventional design. If, for example, the system includes only two tracks, then the commutator may consist simply of a binary flip-flop device having two outputs one of which is connected to the recording head of one track and the other to the head of the second track. In operation, the first pulse in the train is applied to the first track, the second pulse to the second track, the third to the first track and so on, the data pulses being divided between the two tracks.

The drawing illustrates the same process as carried out with four tracks A, B, C and D instead of two, thereby allowing a four-fold increase in the frequencies recorded and reproduced. In this case it is not possible to use a simple flip-flop circuit as the electronic commutator and it becomes necessary to use a double flip-flop device or counter which counts up to four and resets, along with a second flip-flop or gate so that four separate pulse sources are available, each one having a quarter of the frequency of the original carrier. Similarly the same principle may be extended to any number of tracks. Electronic commutation may also be effected by cathode ray commutators in which an electron beam is caused by a sweep circuit to step sequentially along an array of output electrodes whereby each input pulse in the train produces an output pulse at a different output terminal.

As shown in the drawing, the four sequentially separated pulses *a*, *b*, *c* and *d* in the output of the electronic commutator are applied to the respective magnetic recording heads $R_A$, $R_B$, $R_C$ and $R_D$ in the recording system, each head being operatively coupled to one track. Pick-up heads $P_A$, $P_B$, $P_C$ and $P_D$ are provided which, in playback, reproduce the separated pulses as *a'*, *b'*, *c'* and *d'*, the outputs of the heads being combined to provide a train of reproduced data pulses 17 which are fed to a regenerator 18 to produce standardized pulses 17'. These pulses are demodulated by means for example of a passive filter network 19 which averages the pulses to produce an output signal 20 which is a replica of the original signal.

It will be seen that the frequency capacity of the system is multiplied by the number of parallel recording tracks therein and that it becomes possible to record high-frequency data pulses faithfully in a system of ordinary quality.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A high-frequency recording arrangement comprising means to convert a signal into a train of pulses whose repetition rate varies as a function of signal amplitude, a multiple track recording system having a recording element and a reproducing element operatively coupled to each track therein, means sequentially and cyclically to apply said train of pulses to the recording elements in said system to cause the number of pulses recorded on each track to be equal to the total number of pulses in the train divided by the number of tracks, and means coupled to the reproducing elements to combine the pulses derived from said tracks to recreate said train.

2. A high-frequency recording arrangement comprising means to convert a signal into a train of pulses whose repetition rate varies as a function of signal amplitude, a multiple track recording system having a recording element and a reproducing element operatively coupled to each track therein, means sequentially and cyclically to apply said train of pulses to the recording elements in said system to cause the number of pulses recorded on each track to be equal to the total number of pulses in the train divided by the number of tracks, means coupled to the reproducing elements to combine the pulses derived from said tracks to recreate said train, and means to demodulate said recreated train to reproduce the original signal.

3. A high-frequency recording arrangement comprising a pulse-frequency modulator responsive to an input signal to produce a train of data pulses having a relatively high carrier frequency the repetition rate of which varies as a function of the amplitude of the signal, a regenerator coupled to said modulator to produce standardized data pulses, a multiple track recording system including a plurality of parallel tracks and a recording head and a pick-up head operatively coupled to each track, an electronic commutator coupled to said regenerator, said commutator having a plurality of outputs coupled to the recording heads in said system to cause the pulses in said standardized data pulse train to be individually impressed sequentially and cyclically on said tracks, means to combine the outputs of said pick-up heads to recreate said data pulse train on playback operation of said system, and means to demodulate said recreated train to reproduce said signal.

4. An arrangement, as set forth in claim 3, wherein said system has two tracks and said commutator is constituted by a flip-flop circuit having two outputs connected to the two recording heads on said tracks.

5. A high-frequency recording arrangement comprising a pulse-frequency modulator constituted by an astable multivibrator responsive to an input signal to produce a train of data pulses having a relatively high carrier frequency the repetition rate of which varies as a function of the amplitude of the signal, a regenerator constituted by a monostable multivibrator coupled to said modulator to produce standardized data pulses, a multiple track recording system including a plurality of parallel tracks and a recording head and a pick-up head operatively coupled to each track, an electronic commutator coupled to said regenerator, said commutator having a plurality of outputs coupled to the recording heads in said system to cause the pulses in said standardized data pulse train to be individually impressed sequentially and cyclically on said tracks, means to combine the outputs of said pick-up heads to recreate said data pulse train on playback operation of said system, and averaging means to demodulate said recreated train to reproduce said signal.

References Cited by the Examiner

UNITED STATES PATENTS

| | | | |
|---|---|---|---|
| 2,923,773 | 2/1960 | Reynolds | 179—15.55 |
| 3,022,469 | 2/1962 | Bahrs | 332—1 |

IRVING L. SRAGOW, *Primary Examiner.*

S. M. URYNOWICZ, *Assistant Examiner.*